(12) United States Patent
Abend et al.

(10) Patent No.: US 6,732,828 B1
(45) Date of Patent: May 11, 2004

(54) HYDRAULICALLY DRIVEN VEHICLE

(76) Inventors: Robert Abend, 5943 Commerce Blvd., Morristown, TN (US) 37814-1051; Hideaki Okada, 2-18-1, Inadera, Amagasaki-shi, Hyogo (JP)

( * ) Notice: Subject to any disclaimer, the term of this patent is extended or adjusted under 35 U.S.C. 154(b) by 0 days.

(21) Appl. No.: 10/277,115

(22) Filed: Oct. 22, 2002

(51) Int. Cl.⁷ .............................................. B60K 17/356

(52) U.S. Cl. ...................................... 180/242; 180/307

(58) Field of Search ................................. 180/242, 233, 180/305, 307

(56) References Cited

U.S. PATENT DOCUMENTS

| | | | | | |
|---|---|---|---|---|---|
| 4,947,956 | A | * | 8/1990 | Henline | 180/235 |
| 5,979,270 | A | * | 11/1999 | Thoma et al. | 74/606 R |
| 6,189,641 | B1 | * | 2/2001 | Azuma | 180/242 |
| 6,267,163 | B1 | * | 7/2001 | Holmes | 144/336 |
| 2001/0001187 | A1 | * | 5/2001 | Yano et al. | 180/242 |
| 2002/0189251 | A1 | * | 12/2002 | Thoma et al. | 60/487 |

FOREIGN PATENT DOCUMENTS

JP  2000-270651  10/2000

* cited by examiner

*Primary Examiner*—Kevin Hurley
(74) *Attorney, Agent, or Firm*—Sterne, Kessler, Goldstein & Fox, P.L.L.C.

(57) ABSTRACT

A articulate vehicle comprises a first frame disposed at one of front and rear portions of the vehicle and a second frame disposed at the other of front and rear portions of the vehicle. The first frame supports a first transaxle apparatus supporting a first axle. The second frame supports a second transaxle apparatus supporting a second axle. Proximal ends of the frames with respect to the vehicle are coupled to each other through a coupling part so that the first and second frames are rotatable relative to each other around a vertical axis according to steering operation. An engine is mounted on the first frame. A first hydraulic motor is integrally assembled in the first transaxle apparatus so as to drive the first axle. A working vehicle is equipped at a distal side of the second frame with respect to the vehicle. A second hydraulic motor is integrally assembled in the second transaxle apparatus so as to drive the second axle. A hydraulic pump is mounted on either the first or second frame, drivingly connected to the engine, and fluidly connected to both the first and second hydraulic motors.

10 Claims, 11 Drawing Sheets

HYDRAULICALLY DRIVEN VEHICLE

BACKGROUND OF THE INVENTION

1. Field of the Invention

The present invention relates to a vehicle such as a riding lawn mower, provided with a transaxle apparatus supporting an axle to which wheels are attached. More particularly, it relates to a structure of the transaxle apparatus, and a structure for drivingly connecting front and rear transaxle apparatuses in the vehicle to each other.

2. Related Art

Conventionally, there is a well-known articulate riding lawn mower with a pivotally connected first frame and second frame so as to allow the second frame to be folded relative to the first frame. The first frame is equipped with an engine and a transaxle apparatus supporting an axle driven by the engine. The second frame is equipped with a working device such as a mower device, a driver's unit, and an axle casing supporting a freely rotatable axle. Furthermore, a riding lawn mower provided with an Ackerman type steering system is also well known.

For example, the Japanese Patent Laid Open Gazette 2000-270,651 discloses an articulate four-wheeled lawn mower in which the first frame serves as a rear frame and the second frame serves as a front frame. The rear frame is provided with an HST (a hydrostatic transmission) for transmitting engine power to rear wheels supported by the rear frame. Also, the rear frame is provided with a power take-off shaft for taking out power from a pump shaft of a hydraulic pump of the HST so as to transmit the rotation of the power take-off shaft to a mower device supported by the front frame.

The vehicle of such conventional structure is a so called two-wheel drive vehicle, wherein, while the axle supported by the first frame usually disposed rearward is driven by the engine, the axle supported by the axle casing of the second frame usually disposed forward idles regardless of the power for driving the axle of the first frame.

However, the two-wheel drive vehicle, which drives only rear wheels, is disadvantageous in gradeability on a slope and roadability on a bad road. The vehicle, when being bogged in mud etc., cannot escape easily. Thus, in order to resolve the problem, the vehicle is desirably made into a four-wheel drive type, which drives both rear and front wheels.

As a conceivable manner for solving the problem, a four-wheel drive articulate vehicle may be provided. However, in the above-disclosed vehicle including the rear frame on which the engine and the power take-off shaft are mounted, the power take-off shaft is rotated synchronously to rotation of the pump shaft so that the rotary speed of the power take-off shaft is constant as long as the rotary speed of the engine is constant, while the rotary speed of the rear wheels driven by output of the hydraulic motor is changed by speed change operation for adjusting a swash plate angle of the hydraulic pump. Thus, the power take-off shaft for driving the working device cannot be used as a front-wheel drive shaft simply. Even if another power take-off shaft is allowed to be provided in the transaxle apparatus on the rear frame so as to take out output power of the HST and to drive the front wheels synchronously to the rear wheels, there is considerable limitation in arrangement of a mechanical transmission system between the transaxle apparatuses on the front and rear frames because it is necessary to ensure the rotatability of both the frames and to arrange the transmission system for driving the working device in the place. The four-wheel drive articulate vehicle disclosed by U.S. Pat. No. 6,425,452, in which both the transaxle apparatuses on the respective first and second frames incorporate respective HSTs, is very expensive and requires both the HSTs to be controlled synchronously.

SUMMARY OF THE INVENTION

An object of the invention is to provide a four-wheel drive vehicle with high flexibility of parts arrangement depending upon hydraulic piping serving as transmission means between front and rear transaxle apparatuses.

To achieve the object, a vehicle according to the invention comprises a first transaxle apparatus disposed at one of front and rear portions of the vehicle, a first axle supported by the first transaxle apparatus, a first hydraulic motor for driving the first axle integrally assembled in the first transaxle apparatus, a second transaxle apparatus at the other of front and rear portions of the vehicle, a second axle supported by the second transaxle apparatus, a second hydraulic motor for driving the second axle integrally assembled in the second transaxle apparatus, and a common variable displacement hydraulic pump drivingly connected to an engine and fluidly connected to the first and second hydraulic motors.

Preferably, the vehicle is a riding lawn mower.

Preferably, the first hydraulic motor of the first transaxle apparatus and the second hydraulic motor of the second transaxle apparatus are fluidly connected to the common hydraulic pump in series.

Preferably, a pair of axles serve as the first axle of the first transaxle apparatus and are differentially connected to each other through a differential gearing, and another pair of axles serve as the second axle of the second transaxle apparatus and are differentially connected to each other through another differential gearing.

Preferably, a differential-lock system is provided in each of the differential gearings so as to cancel the differential rotation of the pair of first axles or of the pair of second axles.

Preferably, a switching valve is interposed on a connection way between the common hydraulic pump and the first hydraulic motor of the first transaxle apparatus so as to control the supply of fluid to the first hydraulic motor.

Preferably, a fluid sump in the first transaxle apparatus, a fluid sump in a second transaxle apparatus, and a fluid sump in the common hydraulic pump are fluidly connected to one another so that hydraulic fluid is circulated among the fluid sumps.

The hydraulic motor is required to prevent output force thereof transmitted to each of the hydraulic motors from being reduced and to constitute a drive train with the corresponding transaxle apparatus compactly.

Then, as an aspect, the hydraulic motors are incorporated in the respective first and second transaxle apparatuses.

In application of a four-wheel drive system to the vehicle, it is desirable to achieve standardization of manufacture parts so as to save the manufacturing costs.

Accordingly, the first and second transaxle apparatuses are identical with each other in structure.

In application of the four-wheel drive system, necessary transmission means for transmitting power to a working device, which is needed in the conventional vehicle, must be modified.

Therefore, a pair of axles serving as the second axle supported by the second transaxle apparatus are different in length from each other, and a transmission element for drivingly connecting the engine to the working device crosses a longer axle of the pair of second axles.

In arrangement of the first and second transaxle apparatuses, it is necessary to consider weight balance of the vehicle.

Consequently, the first and second transaxle apparatuses are identical with each other in shape, and distributed into one side and the other in a lateral direction of the vehicle.

These and other objects, features and advantages of the invention will become more apparent upon a reading of the following detailed description and drawing.

BRIEF DESCRIPTION OF THE DRAWINGS/FIGURES

DETAILED DESCRIPTION OF THE PREFERRED EMBODIMENT

Figure 1:
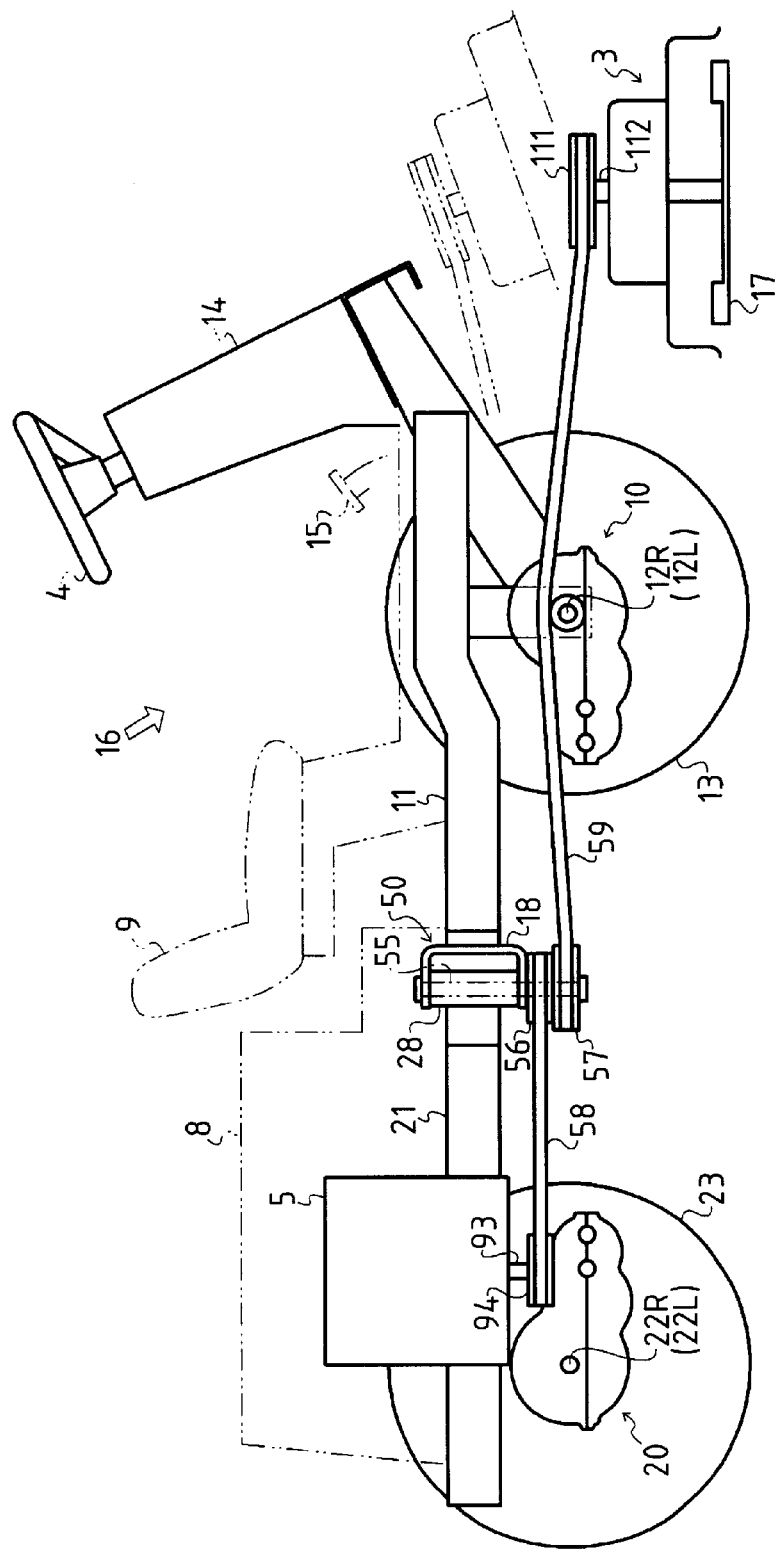
FIG. 1 is a side view of a riding lawn mower as an embodiment of a four-wheel drive articulate vehicle according to the present invention.

Description will be given of a structure of a riding lawn mower according to the present invention. FIG. 1 shows the riding lawn mower equipped at a front portion thereof with a mower device 3 serving as a working device. A front transaxle apparatus 10 is arranged on a front frame 11, and front wheels 13 are fixed to respective front wheel axles 12L and 12R extended laterally from the front transaxle apparatus 10. On the other hand, a rear transaxle apparatus 20 is arranged to a rear frame 21, and rear wheels 23 are fixed to respective rear wheel axles 22L and 22R extended laterally from the rear transaxle apparatus 20.

At a pivotal coupling part 50, a rear end part of the front frame 11 and a front end of the rear frame 12 are horizontally rotatably coupled to each other so that the rear frame 21 can be laterally folded relative to the front frame 11, thereby constituting an articulate vehicle serving as the riding lawn mower.

An engine 5 is carried in rear frame 21. On the front frame 11 are arranged a steering column 14, a steering wheel 4, a pedal 15, and a seat 9 behind the steering column 14, thereby constituting an operation part 16. The mower device 3 driven by the engine 5 is vertically movably disposed downwardly forward from the operation part 16, i.e., at a distal end of the front frame 11 with respect to the vehicle.

On the rear frame 21 is mounted the engine 5 covered with the bonnet 8. The rear transaxle apparatus 20 is arranged under the engine 5.

Figure 2:
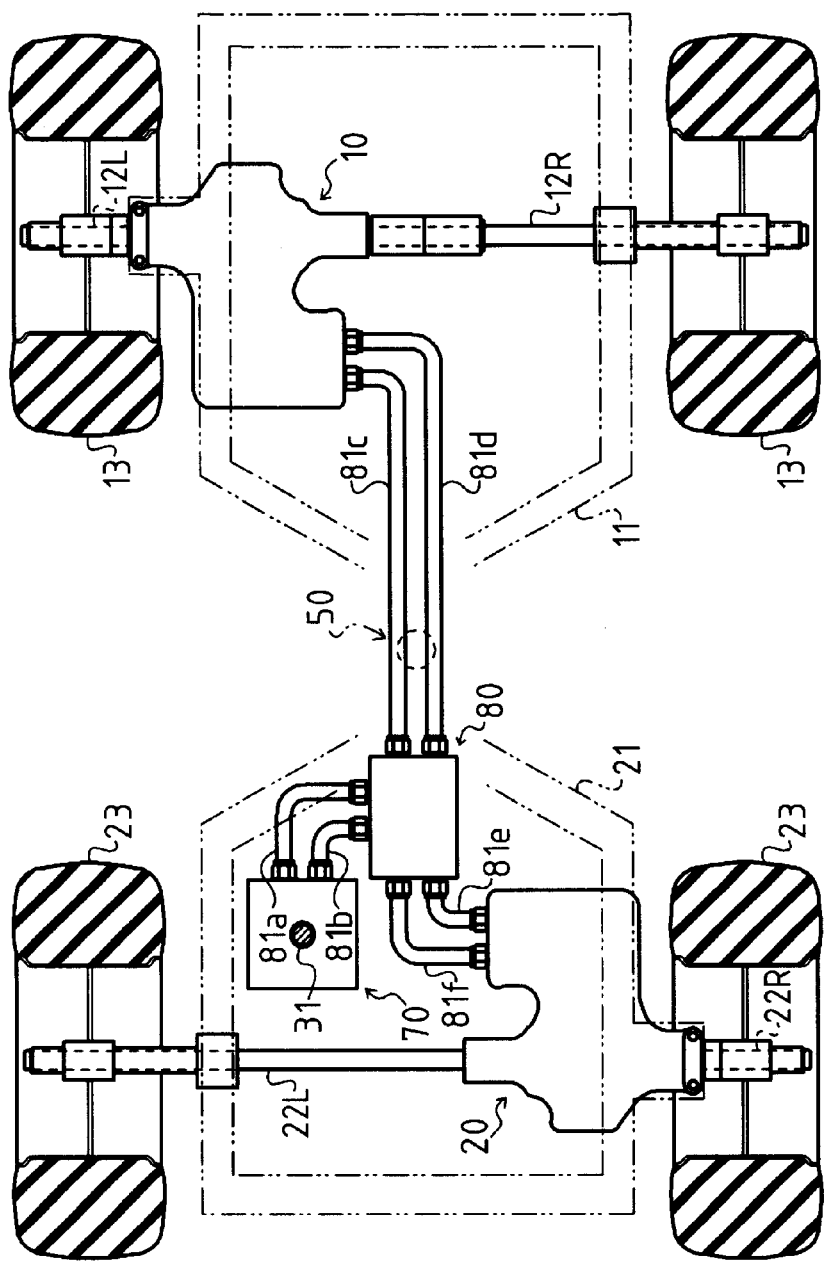
FIG. 2 is a plan view of the vehicle showing arrangement of front and rear transaxle apparatuses 10 and 20.

As shown in FIG. 2, in an initial state of the vehicle (for straight traveling), the rear transaxle apparatus 20 and the front transaxle apparatus 10 are disposed mutually symmetrically with respect to a rotation center of the coupling part 50. More specifically, the front and rear transaxle apparatuses 10 and 20 are identical with each other in shape, and distributed into one side and the other in a lateral direction of the vehicle. The front transaxle apparatus 10 is arranged leftwardly eccentrically on the front wheel axles 12L and 12R, and the rear transaxle apparatus 20 is arranged rightwardly eccentrically on the rear wheel axles 22L and 22R. Alternatively, the front and rear transaxle apparatuses 10 and 20 may be distributed conversely in right and left.

Figure 6:
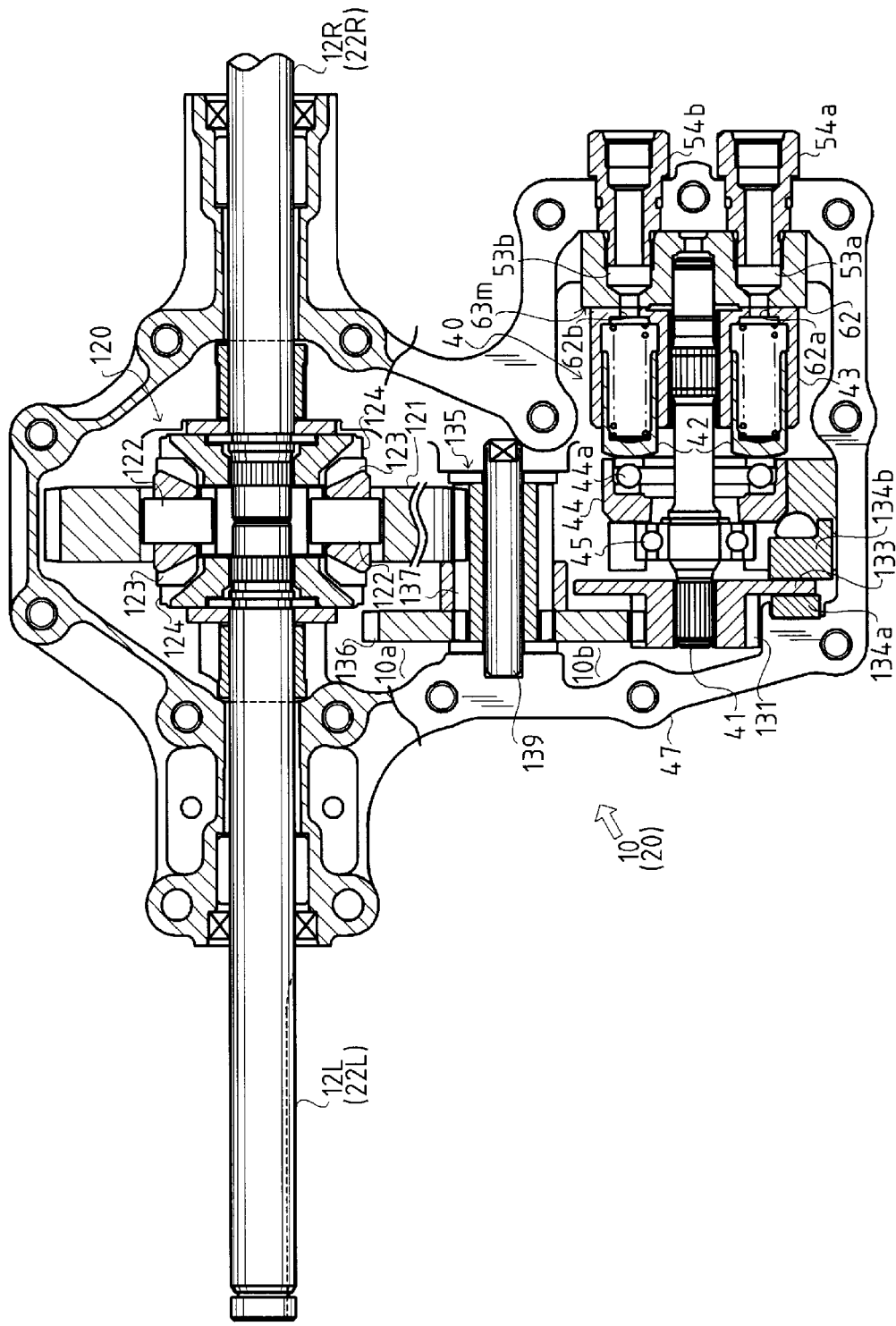
FIG. 6 is a plan view partly in section of a structure, which is common to the front and rear transaxle apparatuses 10 and 20.

Each of the front transaxle apparatus 10 and the rear transaxle apparatus 20 has a common structure shown in FIG. 6., in which a hydraulic motor 40 is integrally assembled so as to drive the front wheel axles 12L and 12R or the rear wheel axles 22L and 22R.

Figure 5:
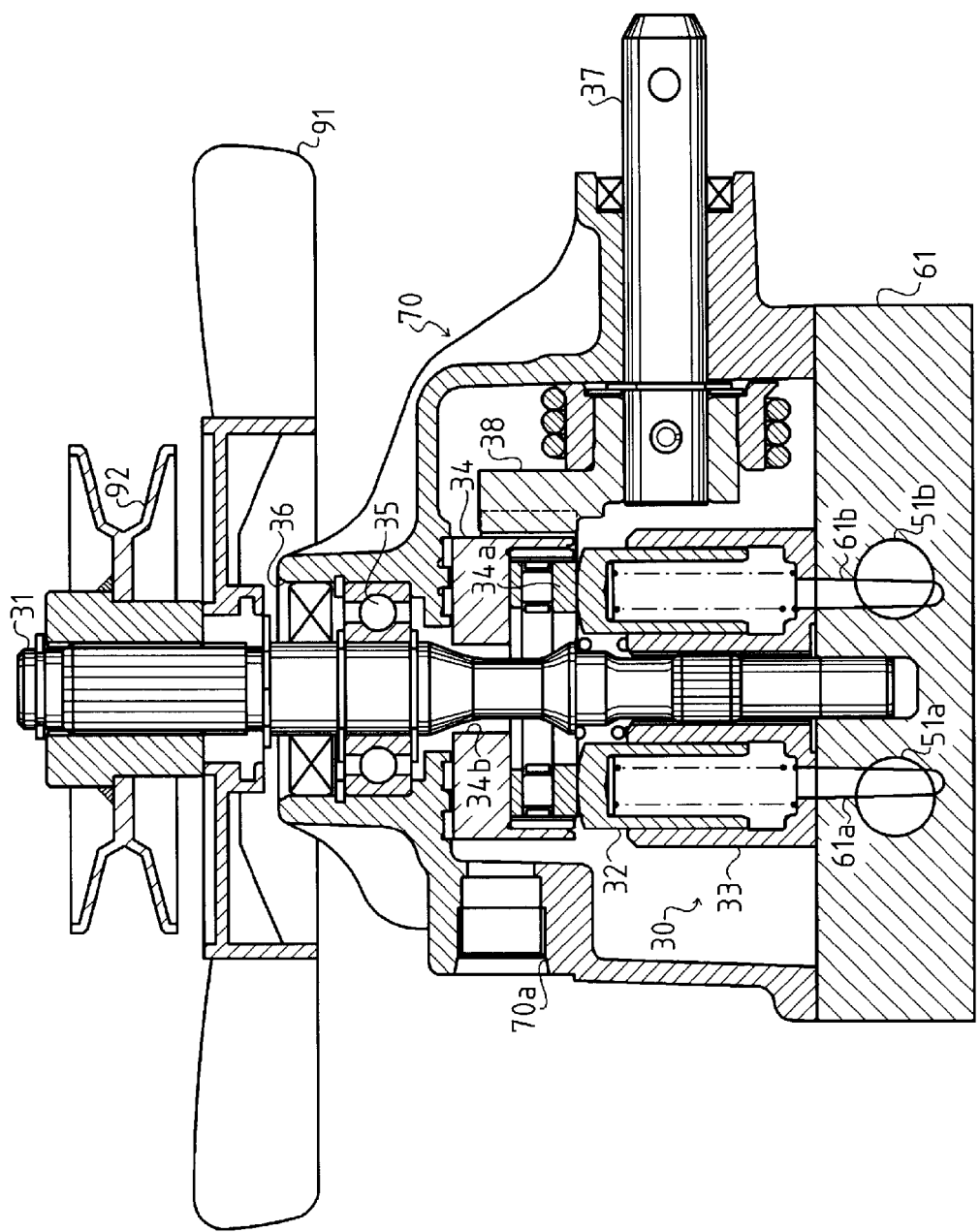
FIG. 5 is an inner side view partly in section of a housing incorporating a hydraulic pump for the transaxle apparatuses.

As shown in FIGS. 2 and 5, a housing 70 which incorporates a hydraulic pump 30 is arranged on the rear frame 21, and a pump center section 61 is disposed in a lower portion of the housing 70. Motor center sections 62 shown in FIG. 6, which are arranged in the front and rear transaxle apparatuses 10 and 20 respectively, are fluidly connected to the pump center section 61 shown in FIG. 5 through a distributor 80 arranged on the rear frame 21 and hydraulic hoses 81a, 81b and etc., as shown in FIG. 2. Alternatively, the housing 70 and the distributor 80 may be arranged on the front frame 11.

Figure 3:
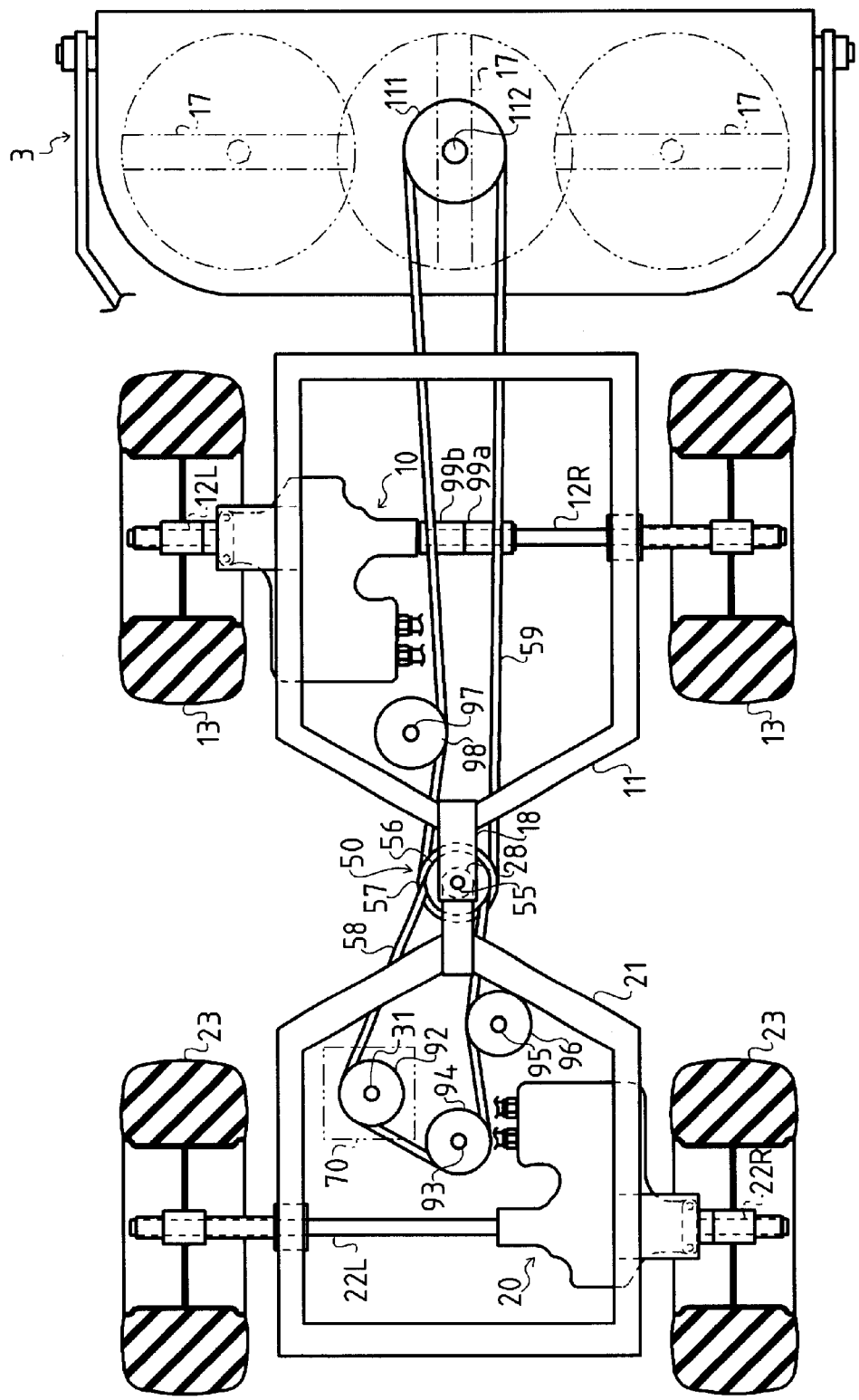
FIG. 3 is a plan view of the vehicle showing a transmission system for driving a working device equipped on the vehicle.

As shown in FIG. 3, at the rear frame 21 side, an engine output pulley 94 is fixed to an output shaft 93 of the engine 5, an HST input pulley 92 is fixed to a pump shaft 31 of the hydraulic pump 30 incorporated in the housing 70, and an idle roller 96 is rotatably supported through a bearing (not shown) by a support shaft 95 hung from the rear frame 21.

On the other hand, at the front frame 11 side, a working device driving power input pulley 111 is fixed to an input shaft 112 of the mower device 3 serving as a working device, and an idle pulley 98 is rotatably supported through a bearing (not shown) by a support shaft 97 hung from the front frame 11.

As shown in FIGS. 1 and 3, regarding the coupling part 50, a cylindrical pivotal coupler 28 which supports a vertical coupling shaft 55 unrotatably is disposed on a laterally middle front end portion of the rear frame 21. On the other hand, a plate pivotal coupler 18, U-like shaped in side view, is disposed on a laterally middle rear end portion of the front frame 11. The coupler 18 is pivotally fitted onto the coupling shaft 55 so as to couple the front and rear frames 11 and 21 to each other, whereby the rear frame 21 can be laterally folded relative to the front frame 11. As mentioned above, couplers 18 and 28 are disposed on respective proximal ends of the front and rear frames 11 and 21 with respect to the vehicle, and are coupled to each other through the coupling shaft 55 so as to constitute the coupling part 50. Thus, both the front and rear frames are coupled so as to be rotatable around the vertical axis of the coupling shaft 55 relative to each other by steering operation (of the steering wheel 4).

A lower portion of the coupling shaft 55 is extended below so as to be rotatably provided thereon with mutually connected input and output pulleys 56 and 57 through bearings (not shown).

As shown in FIG. 3, at the rear frame 21 side is wound a first working-device drive transmission belt 58 around the engine output pulley 94, the HST input pulley 92, the idle roller 96, and the input pulley 56. On the other hand, at the front frame 11 side is wound a second working-device drive transmission belt 59 around an idle roller 98, a working-device driving power input pulley 111, and the output pulley 57.

In this way, engine output power is transmitted to the input pulley 56 through the first working-device drive transmission belt 58 from the engine output pulley 94, thereby rotating the output pulley 57 integrally with the input pulley 56 so as to transmit the power to the working-device driving power input pulley 111 through the second working-device drive transmission belt 59, and thereby rotating the input shaft 112 so as to rotate mowing blades 17.

As shown in FIG. 3, the right front wheel axle 12R is longer than the left front wheel axle 12L so that the front transaxle apparatus 10 extending the axles 12L and 12R is settled at the position shifted leftward from the lateral middle of the front frame 11.

Figure 4:
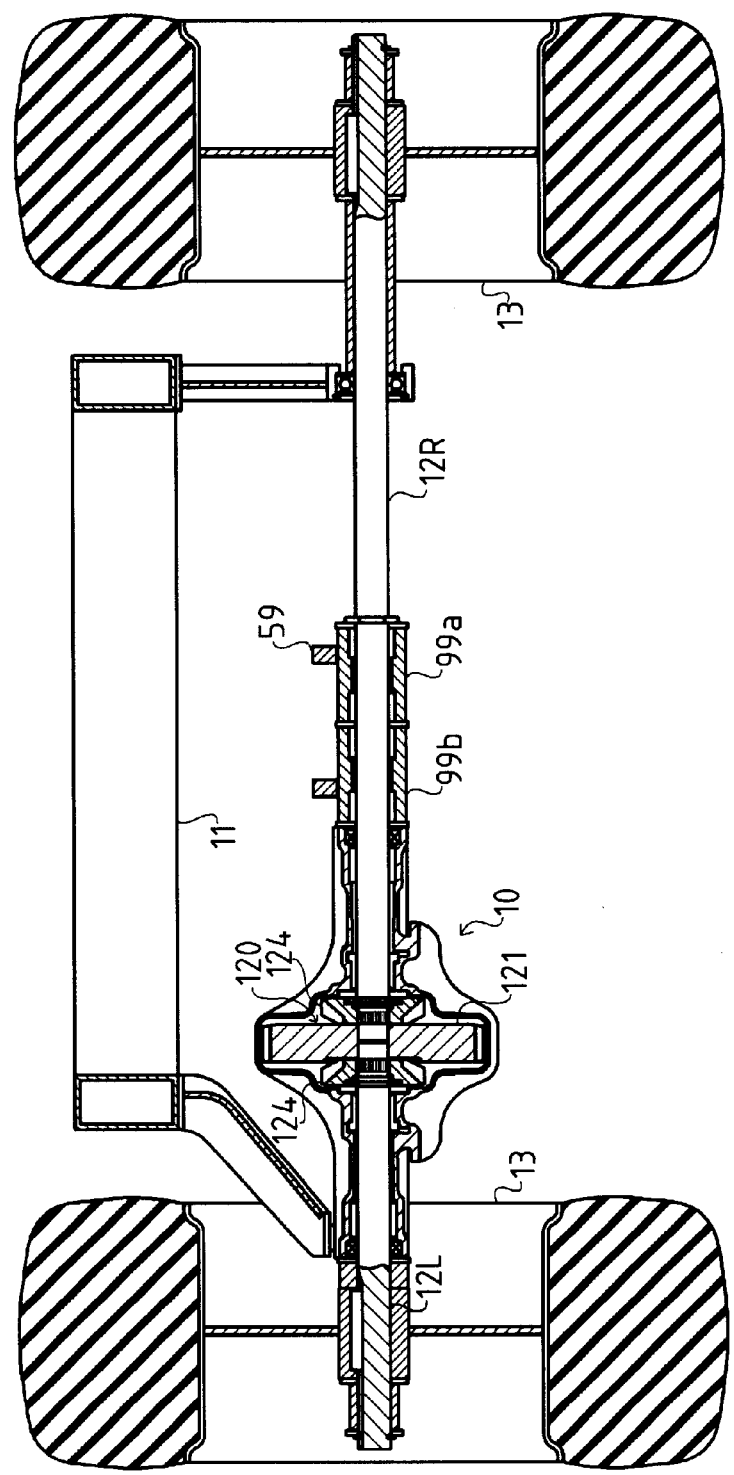
FIG. 4 is a rear view of the front transaxle apparatus 10 arranged between left and right front wheels 13.

As shown in FIGS. 3 and 4, on a portion of the front wheel axle 12R at the substantially lateral middle of the front frame 11 are provided a pair of left and right collars 99a and 99b freely rotatable independently of each other. The second working-device drive transmission belt 59 is allowed to contact at undersurfaces thereof with the respective upper surfaces of the collars 99a and 99b.

Thus, the front transaxle apparatus 10 supports the pair of axles having different lengths, and the second working-device drive transmission belt 59, i.e., the transmission element for drivingly connecting the engine 5 to the mower device 3 serving as a working device crosses the longer axle of the pair of axles and is allowed to contact the longer axle.

As mentioned above, the second working-device drive transmission belt 59 passes through a position higher than the front wheel axle 12R, thereby ensuring a road clearance. Moreover, when the working device 3 is lowered for mowing, the second working-device drive transmission belt 59 is also lowered to the front wheel axle 12R and contacts the collars 99a and 99b. The collars 99a and 99b follow the belt 59 so as to rotate freely relative to the axle 12R while the belt 59 is prevented from directly contacting the axle 12R. Thus, the belt 59 is safe from being damaged by friction.

Alternatively, the front transaxle apparatus 10 may be placed rightwardly eccentrically in the front frame 11. In this case, the rear transaxle apparatus 20 is shifted leftward so as to keep the symmetrical relation of the apparatuses 10 and 20.

Description will now be given of the housing 70 arranged in a rear frame 21. As shown in FIG. 5, the housing 70 is attached and fixed to the upper surface of the pump center section 61. The HST hydraulic pump 30 is disposed in the inside of the housing 70 serving as a fluid sump. The HST hydraulic pump 30 comprises a cylinder block 33 slidably rotatably mounted on an upper pump mounting surface of the pump center section 60. Pistons 32 are reciprocally movably fitted through biasing springs into a plurality of cylinder bores in cylinder block 33. A thrust bearing 34a of a movable swash plate 34 abuts against heads of the pistons 32. An opening 34b is provided at the center of movable swash plate 34 so as to let a pump shaft 31 perforate therethrough. A control arm 38 engages with a side surface of the movable swash plate 34, so that the tilt angle of the movable swash plate 34 is adjusted by rotating a control shaft 37 serving as a rotary shaft of the control arm 38.

In order that the pump shaft 31 may function as an input shaft and be disposed vertically along the rotary axis of the cylinder block 33, the pump shaft 31 is rotatably supported by a bearing 35 fitted in an opening 36 formed in an upper portion of the housing 70, and is not-relatively rotatably engaged with the cylinder block 33.

Thus, an axial piston type variable displacement hydraulic pump 30 is constructed in the housing 70.

The pump shaft 31 projects outwardly at the upper end thereof from the upper portion of the housing 70. An HST input pulley 92, with a cooling fan 91 below, is fixed onto the upper projecting portion of the pump shaft 31.

The HST input pulley 92 receives power from the engine through transmission means so as to rotate the pump shaft 31.

Within the pump center section 61 are bored a pair of kidney-ports 61a and 61b from the upper pump mounting surface, and a pair of horizontal first and second fluid passages 51a and 51b. The kidney-port 61a is connected to the first fluid passage 51a, and the kidney-port 61b to the second fluid passage 51b. Each of the first and second fluid passages 51a and 51b is outwardly open at one end thereof and connected to a connection port (not shown) to be connected to a hydraulic hose.

A feeding-and-discharging port 70a is formed in the upper portion of the housing 70 so as to ensure feeding and discharging of hydraulic fluid between a reservoir tank (not shown) and the fluid sump in the housing 70.

Description will now be given of the front transaxle apparatus 10 and the rear transaxle apparatus 20, referring to only the front transaxle apparatus 10 because both the transaxle apparatuses are integral with each other in structure.

Figure 8:
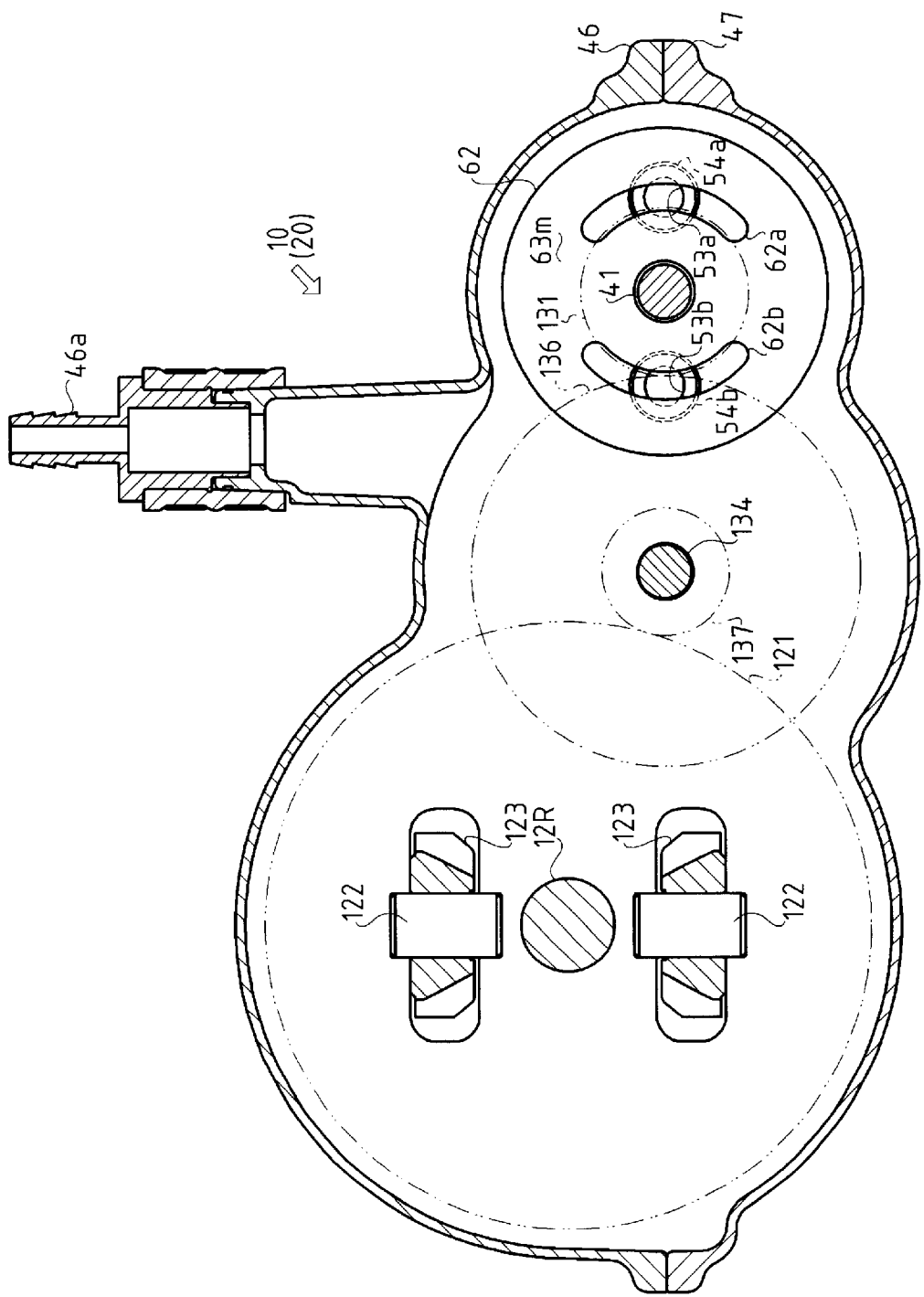
FIG. 8 is a side view partly in section of the axle drive apparatus.

As shown in FIG. 8, the front transaxle apparatus 10 comprises a vertically separable housing formed by joining an upper housing half 46 and a lower housing half 47 through their open surfaces. The housing incorporates a hydraulic motor, etc.

As shown in FIG. 6, an inner space of the housing is divided into first and second chambers 10a and 10b. A differential gearing 120 is disposed in the first chamber 10a, and a hydraulic motor 40 in the second chamber 10b. The driving power of the hydraulic motor 40 is transmitted to the differential gearing 120 through a two-stepped deceleration gear train 135.

Figure 7:
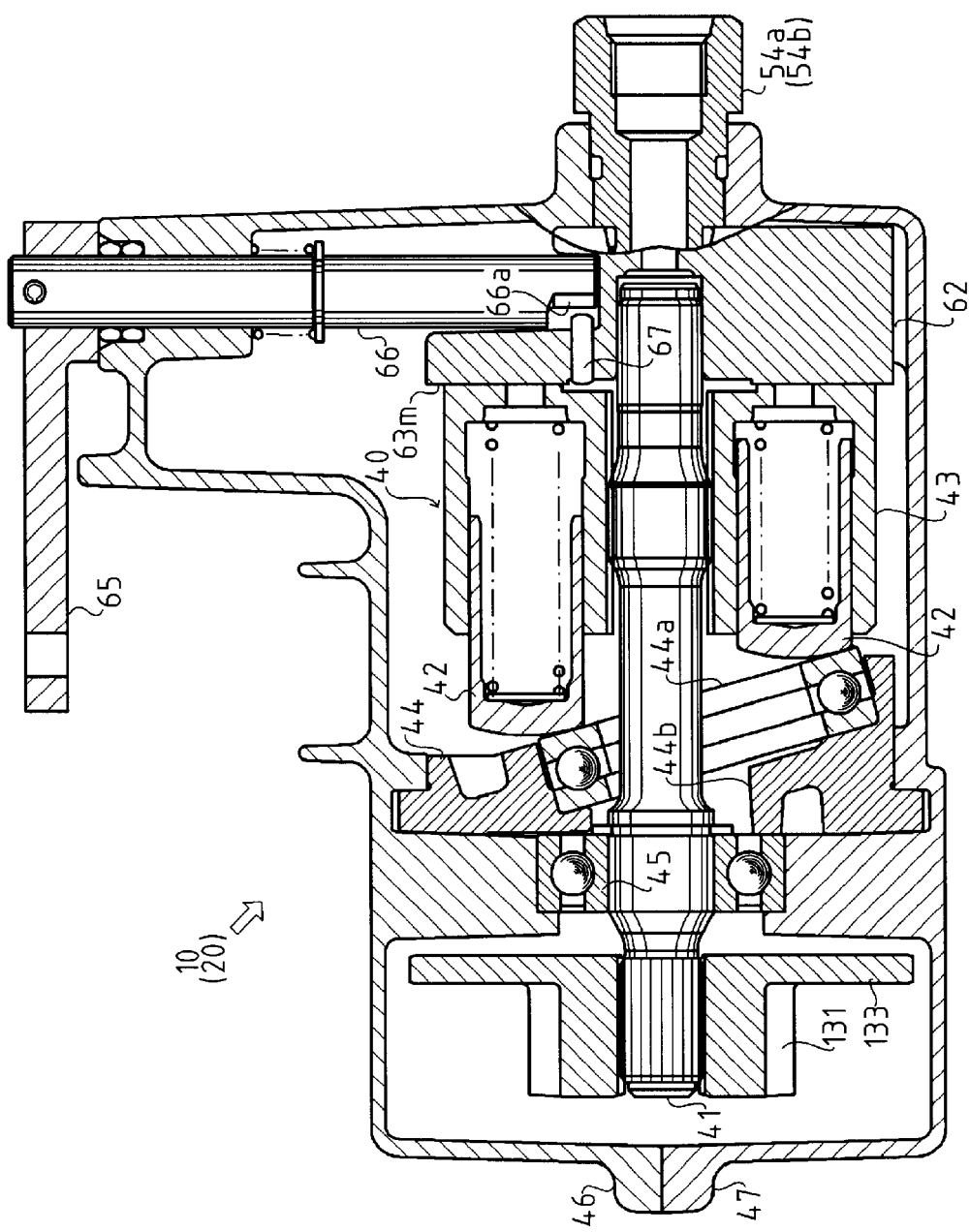
FIG. 7 is a side view partly in section of a hydraulic motor integrally assembled in each of the transaxle apparatuses.

As shown in FIG. 7, in the front transaxle apparatus 10 is integrally assembled the hydraulic motor 40, which comprises a motor center section 62 and a cylinder block 43 slidably rotatably mounted onto a motor mounting surface formed on a vertical portion of the motor center section 62. A plurality of pistons 42 are reciprocally movably fitted into a plurality of cylinder bores in cylinder block 43 through respective biasing springs. Heads of the pistons 42 abut against a thrust bearing 44a of a fixed swash plate 44 which is fixedly sandwiched between upper housing half 46 and lower housing half 47. An opening 44b is provided in the center of the fixed swash plate 44 so as to let the motor shaft 41 perforate therethrough.

In order that the motor shaft 41 may function as an output shaft and be disposed horizontally along the rotary axis of the cylinder block 43, the motor shaft 31 is rotatably supported by a bearing 45 held on the joint surface between the upper and lower housing halves 46 and 47, and is not-relatively rotatably engaged with the cylinder block 43.

Thus, an axial piston type fixed displacement hydraulic motor 40 is constructed in the front transaxle apparatus 10.

Moreover, as shown in FIG. 8, within the motor center section 62 are bored a pair of kidney-ports 62a and 62b from the vertical motor mounting surface 63m, and a pair of horizontal first and second fluid passages 53a and 53b. The kidney-port 62a is connected to the first fluid passage 53a, and the kidney-port 62b to the second fluid passage 53b. As shown in FIG. 6, the first fluid passage 53a is connected to a cap 54a, and the second fluid passage 53b to a cap 54b. Hydraulic hoses are connected to the respective caps 54a and 54b so as to fluidly connect the hydraulic motor 40 to the hydraulic pump 30.

As shown in FIG. 7, a bypass operation lever 65 for opening the first and second fluid passages 53a and 53b to the fluid sump is disposed above the upper housing half 46. The bypass operation lever 65 is fixed at a basal portion thereof to an upper end of a vertical bypass lever shaft 66 rotatably supported by an upper wall of the upper housing half 46. The lower end of the bypass lever shaft 66 is extended into the motor center section 62 so as to be horizontally slideable against the motor center section 62. A thrust pin 67 is provided and allowed to abut against the rotationally sliding surface of the cylinder block 43. The thrust pin 67 is also allowed to contact at an end surface thereof with a flat surface 66a formed by cutting away a bottom side portion of the bypass lever shaft 66.

As shown in FIG. 8, a feeding-and-discharging port 46a is formed in an upper portion of the upper housing half 46 so as to let hydraulic fluid flow between the transaxle apparatus and a reservoir tank 100 (FIG. 9), thereby regulating the volume of hydraulic fluid in the transaxle apparatus.

As shown in FIGS. 6 and 7, on an end portion of the motor shaft 41 opposite to the motor center section 62 is spline-fitted a drive output gear 131 so that the drive output gear 131 rotates together with the motor shaft 41. The drive output gear 131 is integrally formed at a side toward the motor center section 62 with a brake rotor 133 whose diameter is larger than that of drive output gear 131. The rotating motor shaft 41 is braked when the brake rotor 133 is pressed between brake pads 134a and 134b (FIG. 6).

As shown in FIG. 6, a counter shaft 139 is arranged in parallel to the motor shaft 41. A wide small diameter gear 137 is fitted loosely on the counter axis 139, and a large diameter gear 136 is fitted onto a tooted side of the small diameter gear 137, thereby constituting the deceleration gear train 135.

In the deceleration gear train 135, while the large diameter gear 136 engages with the drive output gear 131, the small diameter gear 137 engages with a ring gear 121 of the differential gearing 120 so that driving force of the motor shaft 41 is transmitted to the differential gearing 120 through the deceleration gear train 135.

The differential gearing 120 comprises a ring gear 121 which engages with the small diameter gear 137, pinions 123 rotatably supported by respective pinion shafts 122 which project inward from an inner periphery of the ring gear 121, and side gears 124 fixed onto the respective front wheel axles 12L and 12R and engaging with each of the pinions 123. Thus, the driving force of the motor shaft 41 is transmitted to the front wheel axles 12L and 12R through the intermediate gearing 135, the ring gear 121, the pinions 123 and the side gears 124. Besides, as shown in later-discussed FIG. 11, the differential gearing 120 may be provided with a differential-lock system so that, even when one of the wheels is bogged in mud etc., the vehicle can escape easily.

The above-mentioned structure of the transaxle apparatus is common to the front and rear transaxle apparatuses 10 and 20, thereby contributing for standardization of component parts so as to reduce costs for manufacture and care.

Description will now be given of the fluid distributor 80. As shown in FIG. 2, the fluid distributor 80 is fluidly connected to the connection port of the center section in housing 70 through hydraulic hoses 81a and 81b, and also fluidly connected to the center section in the front transaxle apparatus 10 through hydraulic hoses 81c and 81d, and to the center section in the rear transaxle apparatus 20 through hydraulic hoses 81e and 81f.

Hydraulic fluid discharged from the hydraulic pump 30 which is drivingly connected with the engine is supplied to the front transaxle apparatus 10 and the rear transaxle apparatus 20 through the fluid distributor 80 so as to rotate the hydraulic motors in both the transaxle apparatuses 10 and 20, thereby driving the front wheel axles 12L and 12R, and the rear wheel axles 22L and 22R, respectively.

Thus, the fluid distributor 80 fluidly connects a hydraulic circuit of the hydraulic pump 30 in the housing 70 to hydraulic circuits of the front transaxle apparatus 10 and the rear transaxle apparatus 20.

Figure 9:
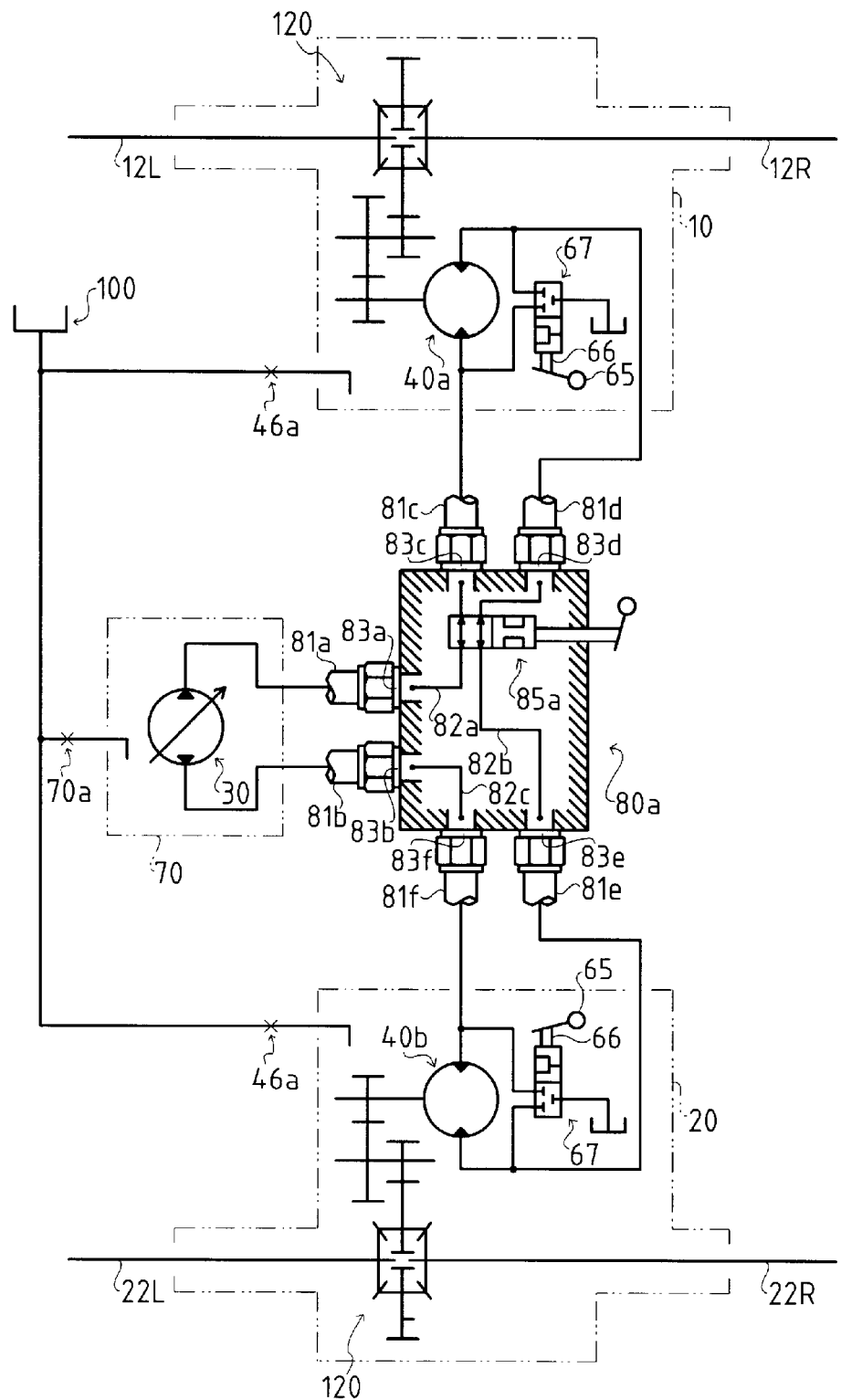
FIG. 9 is a hydraulic circuit diagram including two hydraulic motors connected in series according to an embodiment.
Figure 10:
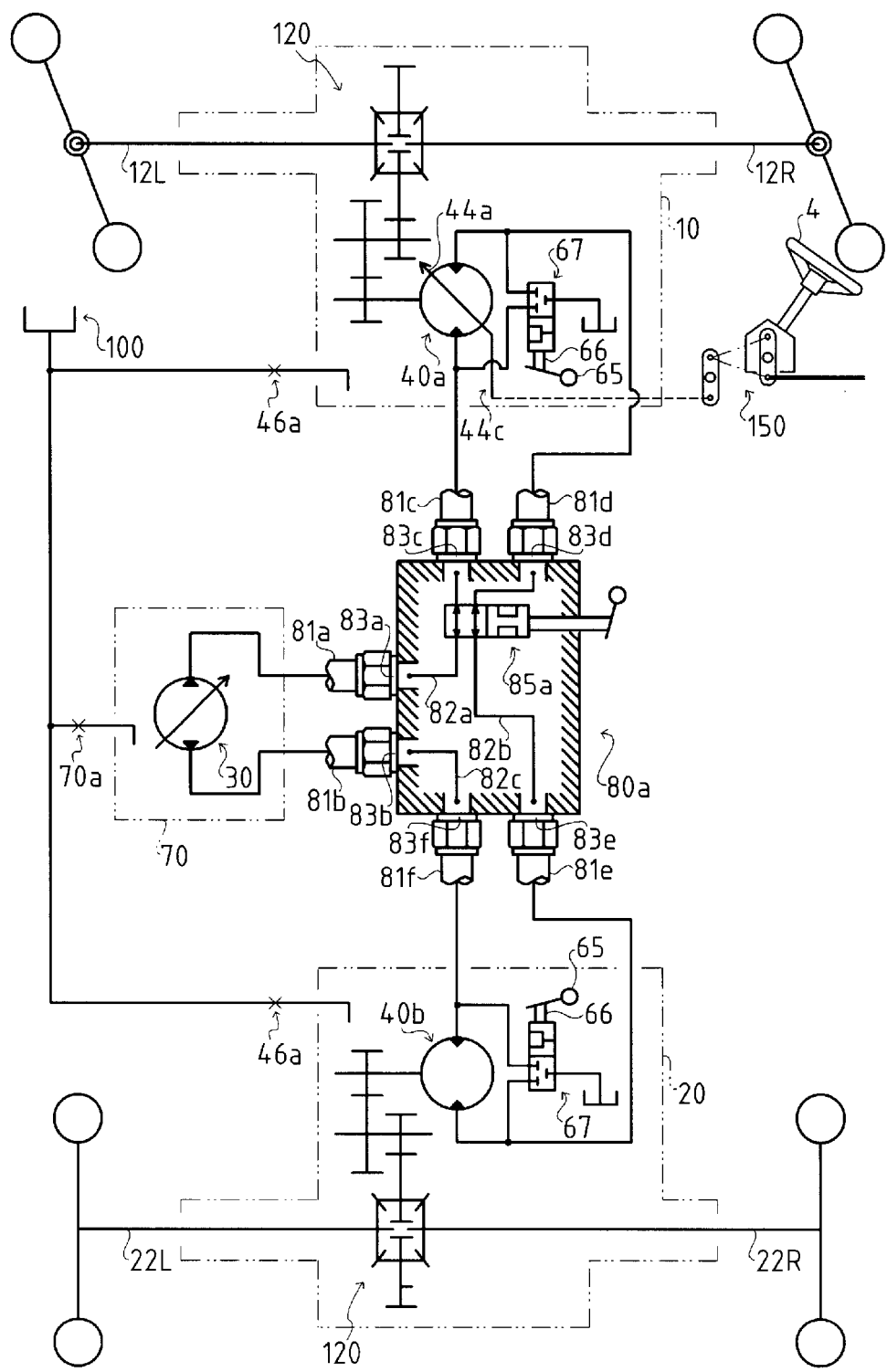
FIG. 10 is a hydraulic circuit diagram including two hydraulic motors connected in series according to another embodiment.
Figure 11:
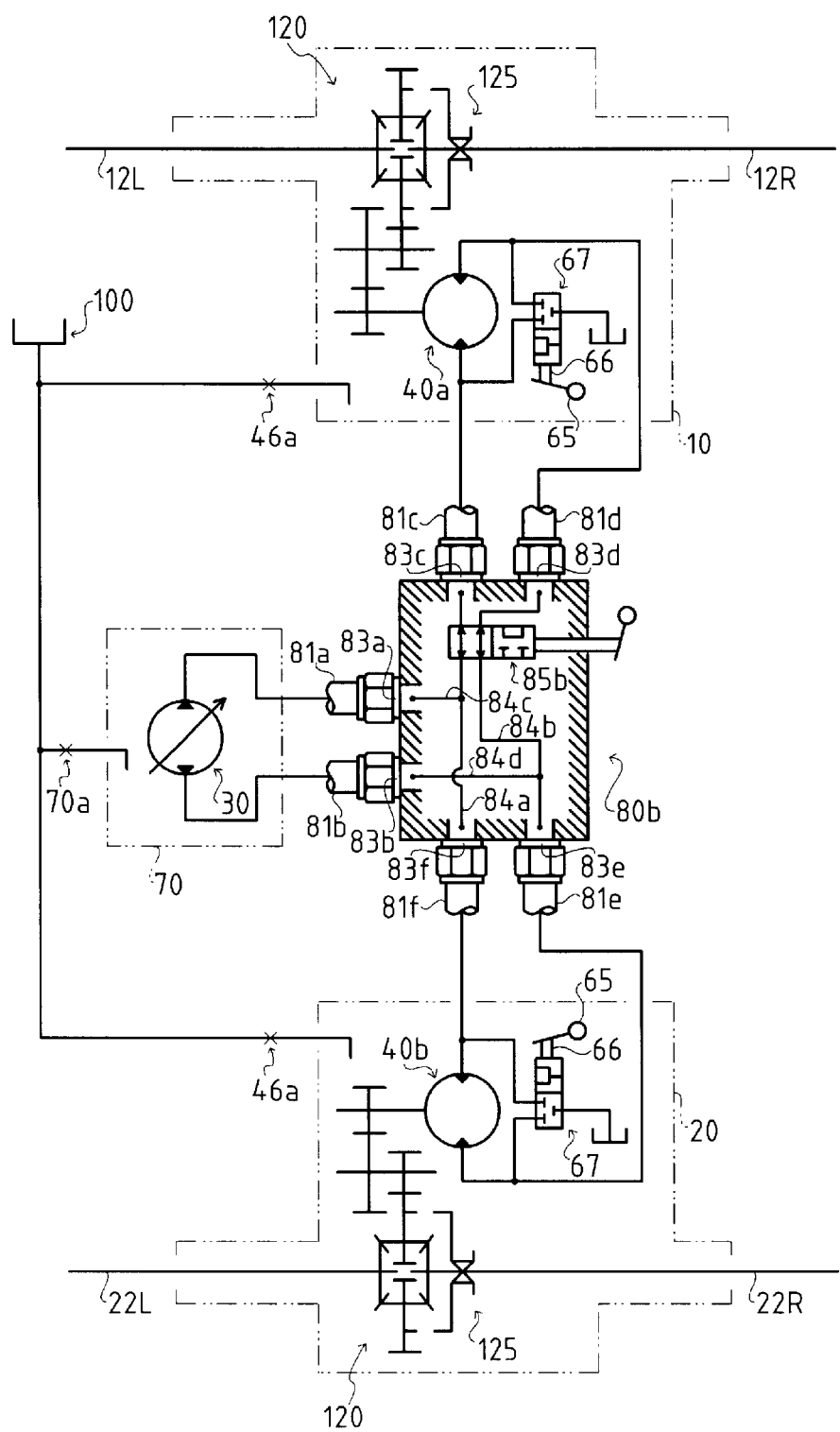
FIG. 11 is a hydraulic circuit diagram including two hydraulic motors connected in parallel.

Two styles as a hydraulic circuit of the fluid distributor 80 are provided for the fluidal connection among the hydraulic motor 30 and the front and rear transaxle apparatuses 10 and 20. One is a fluid distributor 80a to connect the hydraulic motor 40a in the front transaxle apparatus 10 and a hydraulic motor 40b in the rear transaxle apparatus 20 fluidly in series through a control valve 85a, as shown in FIGS. 9 and 10. The other is a fluid distributor 80b to connect the hydraulic motor 40a in the front transaxle apparatus 10 and a hydraulic motor 40b in the rear transaxle apparatus 20 fluidly in parallel through a control valve 85b, as shown in FIG. 11.

The fluid distributor 80a shown in FIG. 9 fluidly connects both the hydraulic motors 40a and 40b in series. Especially, the series connection is applicable to an articulate vehicle whose coupling part 50 is arranged at the longitudinally middle position of the vehicle and serves as the center of left and right turning of the vehicle. In short, this circuit is effective to a vehicle, which generates no or little (tolerant) rotary speed difference between the front wheels at the time of left or right turning of the vehicle.

As shown in FIG. 9, in the fluid distributor 80 are formed first, second and third fluid passages 82a, 82b and 82c. The first fluid passage 82a connects a connection port 83a for the hydraulic hose 81a and a connection port 83c for the hydraulic hose 81c through the control valve 85a. The second fluid passage 82b connects a connection port 83d for the hydraulic hose 81d and a connection port 83e for the hydraulic hose 81e through the control valve 85a. The third fluid passage 82c connects a connection port 83f for the hydraulic hose 81f and a connection port 83b for the hydraulic hose 81b.

The control valve 85a is a directive control valve having four ports and two positions. At a first position of the control valve 85a, the first fluid passage 82a and the second fluid passage 82b are opened for free passage, respectively. At a second position of the control valve 85a, both the first fluid passage 82a and the second fluid passage 82b are closed, and free fluid passages are formed between the connection ports 83a and 83e, and between the connection ports 83c and 83d, respectively.

Due to the above-mentioned construction, when the control valve 85a is set at the first position, hydraulic fluid discharged from the hydraulic pump 30 is supplied to the hydraulic motor 40a of the front transaxle apparatus 10, for example, through the hydraulic hose 81a, the first fluid passage 82a and the hydraulic hose 81b so as to drive the front wheel axles 12L and 12R. Then, hydraulic fluid is supplied to the hydraulic motor 40b of the rear transaxle apparatus 20 through the hydraulic hose 81d, the second fluid passage 82b and the hydraulic hose 81e so as to drive the rear wheel axles 22L and 22R, and is inhaled into the hydraulic pump 30 through the hydraulic hose 81f, the third fluid passage 82c and the hydraulic hose 81b.

As mentioned above, when the control valve 85a is set at the first position, the vehicle drives four wheels, in which the front transaxle apparatus 10 drives the front wheel axles 12L and 12R, and the rear transaxle apparatus 20 the rear wheel axles 22L and 22R, thereby being excellent in traveling on a bad ground or ascent.

Especially, the four-wheel drive vehicle employing the fluid circuit with the series connection is excellent in escaping performance at the time of a wheel being bogged in mud. For example, when a front wheel is stuck in mud, hydraulic fluid discharged from the hydraulic pump 30 flows to the hydraulic motor 40a of the front transaxle apparatus 10 so as to idle the unloaded front wheels, and then flows to the hydraulic motor 40b of the rear transaxle apparatus 20 so as to rotate the loaded rear wheels, too, whereby the vehicle can escape from mud smoothly with driving the rear wheels surely.

On the other hand, when the control valve 85a is set at the second position, hydraulic fluid is not supplied to the hydraulic motor 40a of the front transaxle apparatus 10, that is, hydraulic fluid is supplied only to the hydraulic-motor 40b of the rear transaxle apparatus 20 so as to rotate only the rear wheel axles 22L and 22R, so that the vehicle drives only the rear wheels, thereby being excellent in steering performance.

Alternatively, although not shown, in the control valve 81 may be changed the connection form among the hydraulic hoses 81c, 81d, 81e and 81f. That is, the connection ports 83c and 83d may be connected to the hydraulic motor 40b on the rear frame 21, and the connection ports 83e and 83f to the hydraulic motor 40a on the front frame 11, thereby establishing the vehicle into a front-wheel drive mode, where the vehicle drives only the front wheel axles 12L and 12R and is excellent in steering performance.

Further alternatively, the connection ports 83c and 83d may be connected to each other through a hydraulic hose so as to bypass the hydraulic motor 40a, or the connection ports 83e and 83f may be connected to each other through a hydraulic hose so as to bypass the hydraulic motor 40b, so that the control valve 85a is fixed to the first position without being switched to the second position, thereby making either a front-wheel drive vehicle or a rearwheel drive vehicle.

Furthermore, as shown in FIG. 10, in the front transaxle apparatus 10 which drives the front wheels, it is applicable that a swash plate 44a of the hydraulic motor 40a is movable and a control arm 44b for adjusting the tilt angle of the swash plate 44a is interlockingly connected to the steering wheel 4 through a wire, a link or so on, thereby changing the swash plate angle according to the angle of the steering wheel 4 so as to increase the rotary speed of the front wheel axles.

This composition is especially effective to improve steering performance of a vehicle whose body is arranged so as not to generate a rotary speed difference between the front wheels and the rear wheels when the vehicle turns, i.e., a vehicle whose coupling part 50 is not disposed at the longitudinally middle position of the vehicle, or a four-wheel drive riding lawn mower in which the front wheels are steered by an Ackerman steering system as shown in FIG. 10.

Namely, by making the hydraulic motor for driving steerable (front) wheels into a variable displacement type and increasing the rotary speed of the hydraulic motor in correspondence to the angle of the steering wheel, improved steering performance can be provided for a vehicle such as the riding lawn mower, which has such a body arrangement as to generate a rotary speed difference between the front wheels and the rear wheels at the time of turning of the vehicle, and in which both the hydraulic motors in front and rear transaxle apparatuses are fluidly connected in series.

Next, the fluid distributor 80b shown in FIG. 11 fluidly connects both the hydraulic motors 40a in parallel. This parallel connection style is especially applicable to a vehicle, which turns with a rotary speed difference between front wheels and rear wheels.

As shown in FIG. 11, in the fluid distributor 80 are formed first, second, third and fourth fluid passages 84a, 84b, 84c and 84d. The first fluid passage 84a connects a connection port 83c for the hydraulic hose 81c and a connection port 83f for the hydraulic hose 81f through a control valve 85b. The second fluid passage 84b connects a connection port 83d for the hydraulic hose 81d and a connection port 83e for the hydraulic hose 81e through the control valve 85b. The third fluid passage 84c connects the first fluid passage 84a to a connection port 83a for the hydraulic hose 81a. The fourth fluid passage 84d connects the second fluid passage 84b to a connection port 83b for the hydraulic hose 81b.

The control valve 85b is a directive control valve having four ports and two positions. At the first position of the control valve 85b, the first fluid passage 84a and the second fluid passage 84b are opened for free passage respectively. At the second position of the control valve 84b, the first fluid passage 84a and the second fluid passage 84b are closed, and a free fluid passage is formed between the connection port 83c and the connection port 83d.

Due to the above composition, when the control valve 85b is set at the first position, hydraulic fluid discharged from the hydraulic pump 30 is supplied to the hydraulic motors 40a and 40b of the front and rear transaxle apparatuses 10 and 20, for example, through the hydraulic hose 81a, the third fluid passage 84c, the first fluid passage 82a, and the hydraulic hoses 81c and 81f, respectively, so as to drive the front and rear wheel axles 12L, 12R, 22L and 22R. Then, hydraulic fluid discharged from the hydraulic motors 40a and 40b is inhaled into the hydraulic pump 30 through the respective hydraulic hoses 81d and 81e, the second fluid passage 84b, the fourth fluid passage 84b, and the hydraulic hose 81b.

In this way, when the control valve 85b is set at the first position, both the front transaxle apparatus 10 and the rear transaxle apparatus 20 drive the front wheel axles 12L and 12R, and the rear wheels axle 22L and 22R, respectively, so that the vehicle drives four wheels and is excellent in steering performance and traveling performance on a bad ground or ascent.

On the other hand, when the control valve 85b is set at the second position, hydraulic fluid is not supplied to the hydraulic motor 40a of the front transaxle apparatus 10, that is, hydraulic fluid is supplied only to the hydraulic motor 40b of the rear transaxle apparatus 20 so as to drive only the rear wheel axles 22L and 22R, whereby the vehicle drives only the rear wheels and is excellent in steering performance.

Alternatively, although not shown, in the control valve 81 may be changed the connection form among the hydraulic hoses 81c, 81d, 81e and 81f. That is, the connection ports 83c and 83d may be connected to the hydraulic motor 40b on the rear frame 21, and the connection ports 83e and 83f to the hydraulic motor 40a on the front frame 11, thereby establishing the vehicle into a front-wheel drive mode, where the vehicle drives only the front wheel axles 12L and 12R and is excellent in steering performance.

Further alternatively, a rear-wheel drive vehicle may be made by plugging the connection ports 83c and 83d and holding the control valve 85a at the first position without shifting it to the second position.

Moreover, when employing the parallel connection form as shown in FIG. 11, preferably, the differential gearings 120 of the front and rear transaxle apparatuses 10 and 20 are provided with respective differential-lock systems 125 for restricting the differential rotation of the respective left and right axles, and the vehicle is provided with a control lever for controlling the differential-lock systems 125. Thus, the vehicle is so designed that the differential rotation of the axles is restrained when a wheel is stuck.

According to the parallel connection, hydraulic fluid is divided between the two hydraulic motors 40a and 40b, thereby causing such a problem that a larger amount of hydraulic fluid slows into a lighter-loaded hydraulic motor of the two. If a right front wheel driven by the front hydraulic motor 40b is stuck, for example, the rear hydraulic motor 40b is not supplied with hydraulic fluid and the rear wheels do not drive, whereby the vehicle cannot escape from being bogged.

However, in this case, by operating the differential-lock system 125, load which makes the left front wheel drive is given to the hydraulic-motor 40a, a proper quantity of hydraulic fluid is supplied to the rear hydraulic motor 40b so as to rotate the rear wheels, thereby enabling the vehicle to escape.

Whether the series connection form or the parallel connection form may be applied to the hydraulic circuit of the vehicle, the position of the control valve 85a or 85b may be decided so as to select the driving style of the vehicle between the four-wheel drive and the rear-wheel drive. Thus, vehicles having the same structure in different driving styles can be provided to a market, so that standardization of manufactured parts is realized for reduction of costs.

In this way, the driving style of the vehicle may be selected before shipment from a factory. Alternatively, the vehicle may be provided with an operation lever for switching the position of the control valve 85a or 85b so that a driver can optionally operate the lever so as to select the driving mode of the vehicle between the four-wheel drive mode and the two-wheel drive mode (rear-wheel drive mode or front-wheel drive mode) even when the vehicle travels.

The present invention constructed as described above has the following effects.

A articulate vehicle can drive four wheels so as to improve its steering performance and traveling performance against a bad ground or ascent.

According to such arrangement of the hydraulic motors as to be incorporated in the respective front and rear transaxle apparatuses, a drive train comprising each transaxle apparatus and its corresponding hydraulic motor can be compact.

Since both the front and rear transaxle apparatuses share the same construction, manufactured parts are standardized so as to save costs.

Of both the transaxle apparatuses, one has a distal side with respect to the vehicle, to which a working device is attached, and supports a pair of axles having different lengths. A transmission element for drivingly connecting the engine to the working device crosses a longer axle of the pair of axles. Due to this structure, the transmission element for the working device does not reduce the road clearance of the vehicle.

Since the heavy front and rear transaxle apparatuses are identical with each other in shape and distributed into one side and the other in a lateral direction of the vehicle, the weights of the transaxle apparatuses are distributed left and right so as to balance the vehicle excellently.

What is claimed is:

1. A hydraulically driven vehicle, comprising:
    a first transaxle housing disposed at one of front and rear portions of said vehicle;
    a first axle supported by said first transaxle housing;
    a first hydraulic motor disposed in said first transaxle housing so as to drive said first axle;
    a second transaxle housing disposed at the other of front and rear portions of said vehicle;
    a second axle supported by said second transaxle housing;
    a second hydraulic motor disposed in said second transaxle housing so as to drive said second axle; and
    a common variable displacement hydraulic pump drivingly connected to an engine and fluidly connected to said first and second hydraulic motors.

2. The vehicle as set forth in claim 1, wherein a fluid sump in said first transaxle housing, a fluid sump in said second transaxle housing, and a fluid sump in said hydraulic pump communicate with one another so as to allow fluid to flow among said first and second transaxle housings and said hydraulic pump.

3. The vehicle as set forth in claim 1, wherein said first and second transaxle housings are identical with each other in structure.

4. The vehicle as set forth in claim 1, wherein said vehicle is a riding lawn mower.

5. The vehicle as set forth in claim 1, further comprising:
    a working device equipped at either front or rear end portion of said vehicle;
    a transmission element for drivingly connecting said engine to said working device; and
    a pair of axles having different lengths supported by said first transaxle housing, wherein said transmission element is allowed to contact a longer axle of said pair of axles.

6. The vehicle as set forth in claim 1, wherein first and second transaxle housings are identical with each other in shape, and distributed into one side and the other in a lateral direction of said vehicle.

7. The vehicle as set forth in claim 1, wherein said first hydraulic motor of said first transaxle housing and said second hydraulic motor of said second transaxle housing are fluidly connected to said common hydraulic pump in series.

8. The vehicle as set forth in claim 1, further comprising:
    a differential gearing differentially connecting a pair of axles serving as said first axle of said first transaxle housing to each other; and another differential gearing differentially connecting a pair of axles serving as said second axle of said second transaxle housing to each other.

9. The vehicle as set forth in claim 7, wherein each of said differential gearings is equipped with a lock system which restricts differential rotation of said first axles or of said second axles.

10. The vehicle as set forth in claim 1, further comprising:
a switching valve interposed on a connection way between said first hydraulic motor of said first transaxle housing and said common hydraulic pump so as to control a supply of fluid to said first hydraulic motor.

* * * * *